(12) United States Patent
Shah

(10) Patent No.: US 6,492,012 B1
(45) Date of Patent: Dec. 10, 2002

(54) POLYMER PENETRATED POROUS SUBSTRATES

(76) Inventor: Tilak M. Shah, 104 Lochberry La., Cary, NC (US) 27511

( * ) Notice: Subject to any disclaimer, the term of this patent is extended or adjusted under 35 U.S.C. 154(b) by 0 days.

(21) Appl. No.: 09/496,385

(22) Filed: Feb. 2, 2000

(51) Int. Cl.[7] .............................. B32B 3/26; B32B 3/06
(52) U.S. Cl. ............................... 428/304.4; 428/306.6; 156/182
(58) Field of Search ........................ 428/306.6, 319.7, 428/319.9, 304.4; 442/59, 152; 156/182, 244.11, 249.21

(56) References Cited

U.S. PATENT DOCUMENTS

| | | | |
|---|---|---|---|
| 3,616,197 A | * 10/1971 | Amberg et al. | 156/160 |
| 3,632,391 A | * 1/1972 | Whitfield et al. | 117/62.2 |
| 3,801,011 A | * 4/1974 | Guehler et al. | 206/205 |
| 4,036,675 A | * 7/1977 | Amberg et al. | 156/182 |
| 4,261,776 A | * 4/1981 | Lea et al. | 156/160 |
| 4,288,475 A | * 9/1981 | Meeker | 427/294 |
| 4,376,670 A | * 3/1983 | Rodish | 156/244.21 |
| 4,528,221 A | * 7/1985 | Komatsuzaki et al. | 428/35 |
| 4,529,464 A | * 7/1985 | Jones | 451/285 |
| 4,954,388 A | * 9/1990 | Mallouk et al. | 428/198 |
| 5,082,472 A | * 1/1992 | Mallouk et al. | 55/16 |
| 5,098,498 A | * 3/1992 | Hale et al. | 156/213 |
| 5,125,994 A | * 6/1992 | Harasta et al. | 156/160 |
| 5,447,636 A | * 9/1995 | Banerjee | 210/638 |
| 5,539,072 A | * 7/1996 | Wu | 526/304 |
| 5,584,800 A | * 12/1996 | Scholz et al. | 602/6 |
| 5,681,402 A | * 10/1997 | Ichinose et al. | 156/244.21 |
| 5,692,935 A | * 12/1997 | Smith | 442/38 |
| 5,716,621 A | * 2/1998 | Bello et al. | 424/443 |
| 5,881,521 A | * 3/1999 | Porter et al. | 52/417 |
| 5,897,424 A | * 4/1999 | Evans et al. | 451/285 |
| 5,938,648 A | * 8/1999 | LaVon et al. | 604/358 |
| 6,040,251 A | * 3/2000 | Caldwell | 442/123 |
| 6,087,079 A | * 7/2000 | Newberry et al. | 430/510 |
| 6,156,451 A | * 12/2000 | Banerjee et al. | 429/134 |
| 6,187,696 B1 | * 2/2001 | Lim et al. | 442/77 |

FOREIGN PATENT DOCUMENTS

FR            0143056 A1   * 5/1985

* cited by examiner

Primary Examiner—M. Alexandra Elve
Assistant Examiner—L. Edmondson
(74) Attorney, Agent, or Firm—A. Jose Cortina; Kilpatrick Stockton LLP

(57) ABSTRACT

A polymer coated porous product includes a first porous substrate and a polymer coating penetrating the porous substrate. The polymer coated porous product may optionally include a second porous substrate, and the polymer coating penetrates both the first and second porous substrate. A process and an apparatus for producing polymer coated porous substrate. The process includes overlaying a film of polymer material onto a porous substrate, heating the film of polymer material, and vacuum drawing the heated film of polymer material into the porous substrate. The apparatus includes an extruder, means for producing a film of polymer material over a porous substrate, means for heating the film of polymer material and at least one vacuum unit. The vacuum unit draws the film of polymer material into a porous substrate.

33 Claims, 6 Drawing Sheets

POLYMER PENETRATED POROUS SUBSTRATES

BACKGROUND OF THE INVENTION

1. Field of the Invention

This invention generally relates to thermoplastic processing and, more particularly, to a process for producing a polymer coating on fabric materials and other porous substrates.

2. Description of the Related Art

Thermoplastic coatings have long been applied to fabrics. These thermoplastic coatings are often used to produce waterproof, but breathable, fabrics. Waterproof/breathable fabrics are then used in the design and manufacture of waterproof rain gear and other waterproof outerwear.

One method of producing thermoplastic coatings on fabrics is called film or sheet-lamination. This method bonds a thin film or sheet of thermoplastic material to a fabric. The sheet-extrusion process uses a conventional extruder to produce the hot thin sheet of thermoplastic material. The fabric material is then overlaid onto the hot thin sheet of thermoplastic material. Because the thin sheet of thermoplastic material is still hot from the extruder, the thin sheet of thermoplastic material should ideally bond and stick to the fabric material. This process does not provide the best adhesion between the two layers, and only gives surface tac-weld. Thus, it can be delaminated with little effort.

Another commonly-used method to produce thermoplastic coatings on fabrics is called "knife-over-roll." This method is also used to apply a thin sheet of elastomeric polymer onto a fabric. The knife-over-roll method melts the elastomeric polymer material. A special tool, or "knife," applies a thin layer of the melted elastomeric polymer material onto the roll and is then transferred onto the fabric. The elastomeric polymer material cools and produces a thin sheet of polymer on the fabric material.

A third commonly-used method is a "drop" method. The elastomeric polymer material is melted and then simply "dropped" onto the fabric material. A roller or scraper tool is then used to smooth the melted elastomeric polymer material into a thin sheet.

A fourth method applies solvent based adhesive on the fabric. A layer of film is then laminated on it through the application of heat and pressure. The adhesive serves to increase bonding and peel strength between fabric and film.

U.S. Pat. No. 4,496,508 to Hartmann et al. is an example of fabrics with bonded polymer coatings. Hartmann et al. describes extruded polypropylene filaments that are bonded to a porous fabric. The bonded polypropylene filaments thus provide a spun-bonded fabric. Again, however, the polypropylene filaments are bonded and, thus, easily peeled away from the underlying porous fabric. Hartmann et al. also utilizes polymer filaments, and these filaments are costly to place and to bond to the porous fabric.

There is, accordingly, a need in the art for a process which does not require an adhesive layer between fabric and polymeric film, a process which can utilize a variety of thermoplastic/polymer materials, and a process which is always cost effective to implement.

BRIEF SUMMARY OF THE INVENTION

The aforementioned problems are resolved by a process for producing a polymer coating penetrating a porous substrate. The process of the present invention allows the polymer coating to penetrate the porous substrate and produce a composite polymer-penetrated porous substrate. The process includes the steps of continually extruding material onto a roll of two to three roll stack, and on that film, overlaying fabric or porous substrate. As the film is tac-welded to the porous substrate, enough heat is maintained and vacuum is applied to draw the heated film of polymer material onto the porous substrate. The process produces a polymer coating that penetrates and adheres to the porous substrate.

The process of the present invention is applicable to all porous substrates. The porous substrate, for example, may utilize cotton fabrics, silks, wools, and even polymer blends such as polyesters, rayons, etc. The process of the present invention may utilize other porous substrates, such as metal wire materials, carbon filament materials, and glass filament materials. The process is also applicable to perforated substrates, such as perforated vinyl, perforated leather, and perforated suede. The present invention is applicable to clothing fabrics, carpets, rugs, outdoor floor coverings and awnings, and other fabric products where waterproofing is desirable.

An alternative process for producing a polymer coating on a porous substrates is also disclosed. The process includes the steps of interposing a film of polymer material between a first porous substrate and a second porous substrate. The film of polymer material is heated and vacuum drawn into the first porous substrate and into the second porous substrate.

A product made according to a process is also disclosed. The product includes a porous substrate and a polymer coating penetrating and adhering to the porous substrate. The polymer coating is formed by continually extruding a film of polymer material onto the porous substrate. The film of polymer material is heated and vacuum drawn into the porous substrate.

A product is also disclosed. The product includes a first porous substrate and a polymer coating penetrating and adhering to the first porous substrate. The product may also include a second porous substrate, and the polymer coating penetrates and adheres to both the first porous substrate and the second porous substrate.

An apparatus for producing polymer coatings on a porous substrate is disclosed. The apparatus includes an extruder, die, means for overlaying film on top or bottom of the porous substrate, means for heating a film of polymer material and at least one vacuum unit. The one vacuum unit draws the heated film of polymer material into the porous substrate. The apparatus may further include means for overlaying the porous substrate and the film of polymer material.

BRIEF DESCRIPTION OF THE SEVERAL VIEWS OF THE DRAWINGS

These and other features, aspects, and advantages of the present invention will be better understood when the following Detailed Description of the Invention is read with reference to the accompanying drawings, wherein.

DETAILED DESCRIPTION OF THE INVENTION

Figure 1:
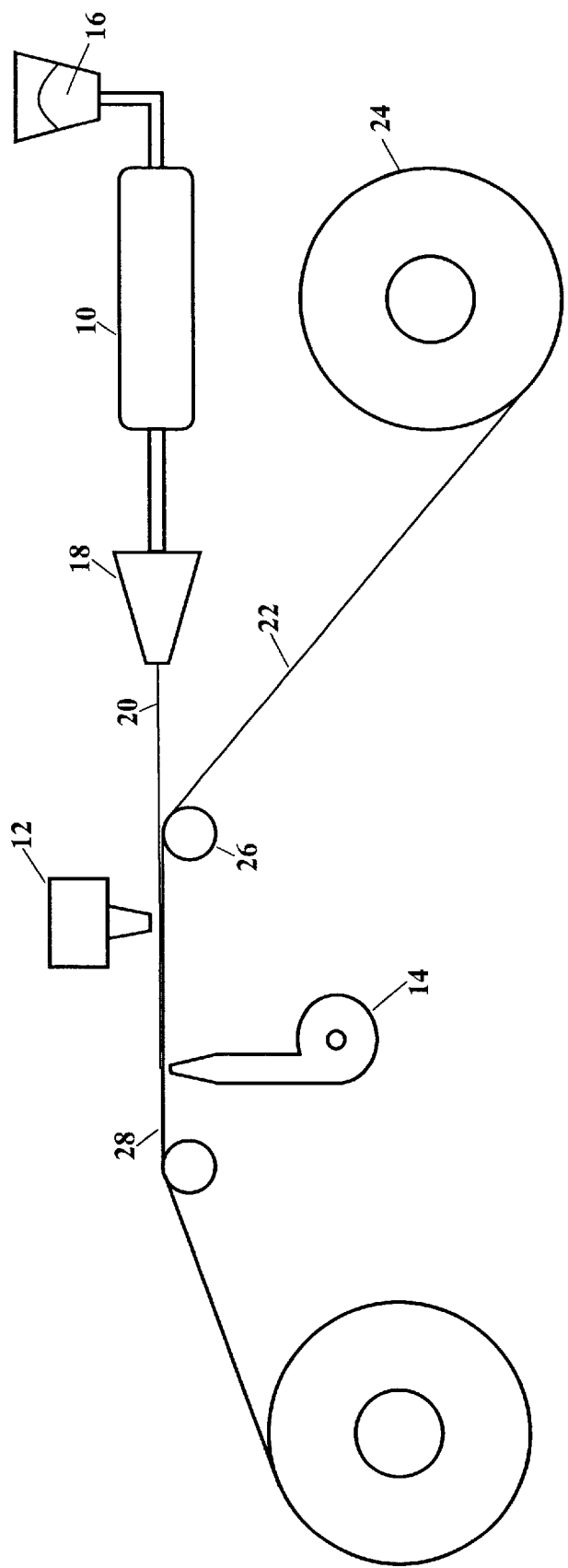
FIG. 1 shows one embodiment of the process of the present invention.

FIG. 1 shows one embodiment of the process of the present invention. The process includes an extruder 10, a heating element 12, and a vacuum unit 14. The extruder 10 is fed pelletized/granular polymer material 16, and the extruder 10 heats and melts the polymer material. The extruder 10 forces the melted polymer material through a forming die 18 and the melted polymer material is formed into a continuous film 20 of polymer material.

The extruder has the following settings: Barrel temperatures from about 250° Farenheit to about 450° Farenheit, and the adapter/dies from about 275° Farenheit to about 460° Farenheit.

The film 20 of polymer material can have a range of thicknesses. The film 20 of polymer material has a preferable thickness of between about 0.0001 inch and about 0.010 inch, a more preferable thickness of between about 0.00075 inch and about 0.004 inch, and a most preferable thickness of between about 0.001 inch and about 0.002 inch.

The film 20 of polymer material is overlaid onto a porous substrate. The porous substrate is shown as a first fabric material 22. The first fabric material 22 is stored on a first fabric roll 24, and a system of rollers 26 is used to overlay the film 20 of polymer material onto the first fabric material 22.

The film 20 of polymer material is then passed under the heating element 12. The film 20 of polymer material is preferably heated to a temperature below the melting point of the film 20 of polymer material. The film 20 of polymer material turns gummy or tacky as the overlay passes beneath the heating element 12.

The film 20 of polymer material, for example, could be polyurethane. The heating unit 12, for example, could be an infrared (IR) heating unit capable of heating up to 500° Farenheit. The heating element 12 heats the film 20 of polyurethane material to a temperature of preferably between about 275° Farenheit and about 375° degrees Farenheit, more preferably between about 300° Farenheit and 360° Farenheit and most preferably between 325° Farenheit and 350° Farenheit. The film 20 of polymer material turns soft above its vicat softening point and becomes heated and tacky as the film 20 of polymer material passes the heating element. "Heated and tacky," as used herein, means it loses its memory and is capable of penetrating and adhering to the fabric and/or "locking the fibers."

Once the film 20 of polymer material is heated, the film 20 of polymer material passes over the vacuum unit 14. The vacuum unit 14 applies a vacuum to the film 20 of polymer material. The applied vacuum draws the heated and tacky film 20 of polymer material into the porous first fabric material 22. The heated and tacky film 20 of polymer material penetrates and adheres to the porous first fabric material 22, and the fibers of the first fabric material 22 become entangled with the polymer material. This application of both heat and vacuum produces a product 28 having a polymer coating penetrating and adhering to the porous substrate. The product 28 can then be rolled for subsequent processing.

This vacuum unit is preferably set at to produce a negative pressure of between about 10 inches of mercury ("in.Hg") and about 35 in.Hg, more preferably a negative pressure of between about 15 in.Hg and about 35 in.Hg, and most preferably a negative pressure of between 15 in.Hg and 25 in.Hg.

The product 28 is very advantageous. The product produced by the present invention is waterproof, but, breathable. Although the polymer material penetrates and adheres to the fabric material, the resultant product 28 remains porous. Each fabric pore is smaller than a raindrop but, still, larger than a molecule of water. The product 28, therefore, prevents penetration of raindrops, but, allows air and water vapors to migrate through the product 28.

The resulting product 28 is cost effective. The process of the present invention preferably utilizes inexpensive polymer materials to produce the resulting product 28.

The product 28 also has superior durability. The heated and gummy film 20 of polymer material, as mentioned above, penetrates and adheres to the porous first fabric material 22. The fibers of the first fabric material 22 become entangled with the polymer material. Close magnified inspection shows the fibers actually sever and are discontinuous within the resulting product 28. The product produced by the present invention is, instead, a composite material having greater durability than conventional film/fabric materials. The polymer-coated porous substrate has greater abrasion resistance and greater tear resistance.

The process of the present invention can utilize any thermoplastic elastomer to produce the film 20 of polymer material. A non-exclusive list of the possible thermoplastic polymers includes polyurethanes (polyesters or polyethers), thermoplastic-polyamides, polyester co-polymers, acrylic elastomers, polyolefin elastomers, propylene elastomers, plasticized polyvinylchloride, styrenic elastomers, fluoroelastomers, and blends of one or more of each. The process can utilize polymers with acrylic co-blends that lower the melting point of the polymer material. The process can utilize polymers blended with lubricants to improve extrusion properties. The process can utilize polymers blended with oil-resistant oleophobic polymers to prevent body oils, cosmetics, lotions, insect repellents, and other oil-based products from affecting the waterproof/breathable properties of the material. The process can even utilize polymers blended with anti-bacterial agents and anti-fungal agents, and other functional and/or non-functional additives.

The process of the present invention is applicable to all fabrics and fabric products. The present invention may utilize cotton fabrics, silks, wools, and even polymer blends such as polyesters, rayons, etc. The present invention is also applicable to carpets, rugs, outdoor floor coverings and awnings, and other fabric products where waterproofing is desirable.

Although the process has been described as utilizing fabrics, those skilled in the art also recognize the process of the present invention may utilize other porous substrates, such as metal wire materials, carbon filament materials, and glass filament materials. The process is also applicable to perforated substrates, such as perforated vinyl, perforated leather, and perforated suede.

Those skilled in the art also recognize the heating element 12 can be any means for heating the film 20 of polymer material. The heating element 12 may be a conventional radiant heating element utilizing electricity or open flame. The heating element 12 may be an infrared heating element. The heating element 12 may also utilize a magnetron to emit microwaves or any other portion of the electromagnetic spectrum.

Those skilled in the art, furthermore, will readily recognize the film 20 of polymer material may be heated to any temperature. While the preferred embodiment heats the film 20 of polymer material to a temperature below the melting point, and above its vicat softening point, the film 20 of polymer material may be heated to any temperature that facilitates processing or material properties.

Those skilled in the art also recognize the process is applicable to a great variety of film thickness. While the process is described as utilizing the film 20 of polymer material, the process is applicable to films having a preferable thickness in the range of 0.0001 inch (e.g., 0.01 mils) to 0.25 inch.

Figure 2:
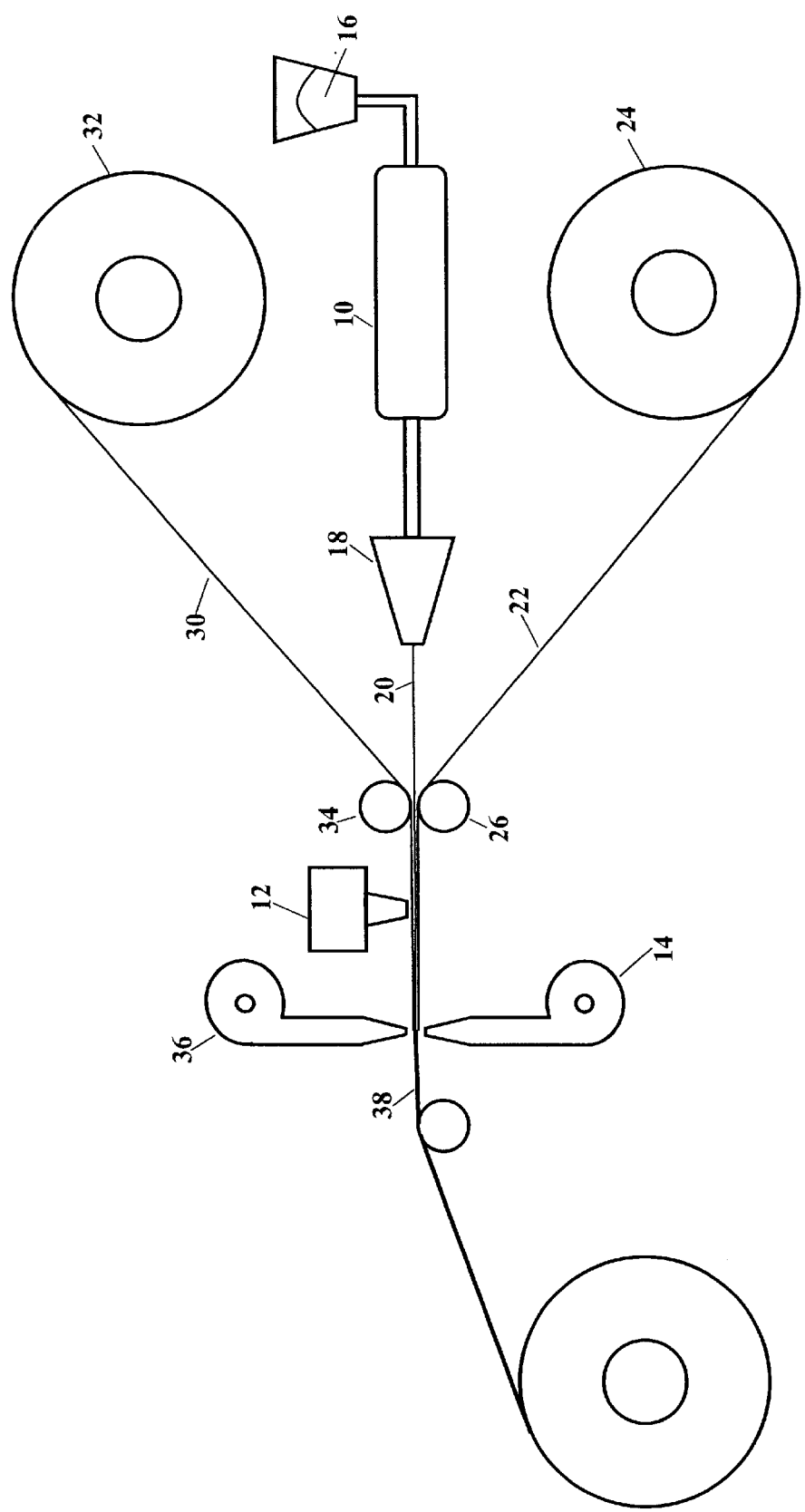
FIG. 2 is an alternative embodiment of the process of the present invention.

FIG. 2 shows an alternative embodiment of the process of the present invention. The extruder 10, the heating element 12, and the vacuum unit 14 are shown as in FIG. 1. The extruder 10 forces the melted polymer material through the forming die 18 and the melted polymer material is formed into the continuous film 20 of polymer material.

In this alternative embodiment, however, the film 20 of polymer material is interposed between two layers of porous substrates. The first porous substrate, as in FIG. 1, is the first fabric material 22. A second porous substrate, shown as a second fabric material 30, is stored on roll 32. Another system 34 of rollers is used to overlay the second fabric material 30 onto the film 20 of polymer material.

The film 20 of polymer material is then heated. The film 20 of polymer material, as before, is preferably heated to a temperature below the melting point of the film 20 of polymer material. The film 20 of polymer material turns gummy or tacky as the film 20 of polymer material passes beneath the heating element 12.

Once the film 20 of polymer material is heated, the film 20 of polymer material is subjected to a vacuum. The vacuum unit 14 applies a vacuum to the first fabric material 22. A second vacuum unit 36 applies a vacuum to the second fabric material 30. The heated and tacky film 20 of polymer material is drawn into both the porous first fabric material 22 and the porous second fabric material 30. This application of both heat and vacuum produces a polymer-coated product 38.

The alternative embodiment of the process shown in FIG. 2 produces an especially unique and useful product. The polymer-coated product 38 has a polymer coating sandwiched between two layers of fabric. The polymer-coated product 38 remains waterproof and breathable, but the alternative embodiment of the invention eliminates the unsightly "rubber" exterior of other waterproof/breathable materials.

Other waterproof/breathable materials, for example, have a slick, rubber-like exterior side. Garments made from these conventional waterproof/breathable materials all have a slick, rubber-like outer appearance. Although the garments are waterproof and breathable, all clothing manufacturers are forced to design waterproof clothing with the same slick, rubber-like exterior. These conventional waterproof/breathable materials severely limit fashion designers, and consumers have little choice in styles.

The alternative embodiment of the present invention represents a significant advance in technology and consumer choice. Because the polymer-coated product 38 has a polymer coating sandwiched between two layers of fabric, textile manufacturers can now manufacture waterproof/breathable materials that have a fabric exterior. Waterproof/breathable garments made of the polymer-penetrated product 38 can have a comfortable inner fabric lining and a plethora of outer fabric choices. The present invention thus allows fashion designers to design and to offer a whole new genre of waterproof/breathable garments.

Figure 3:
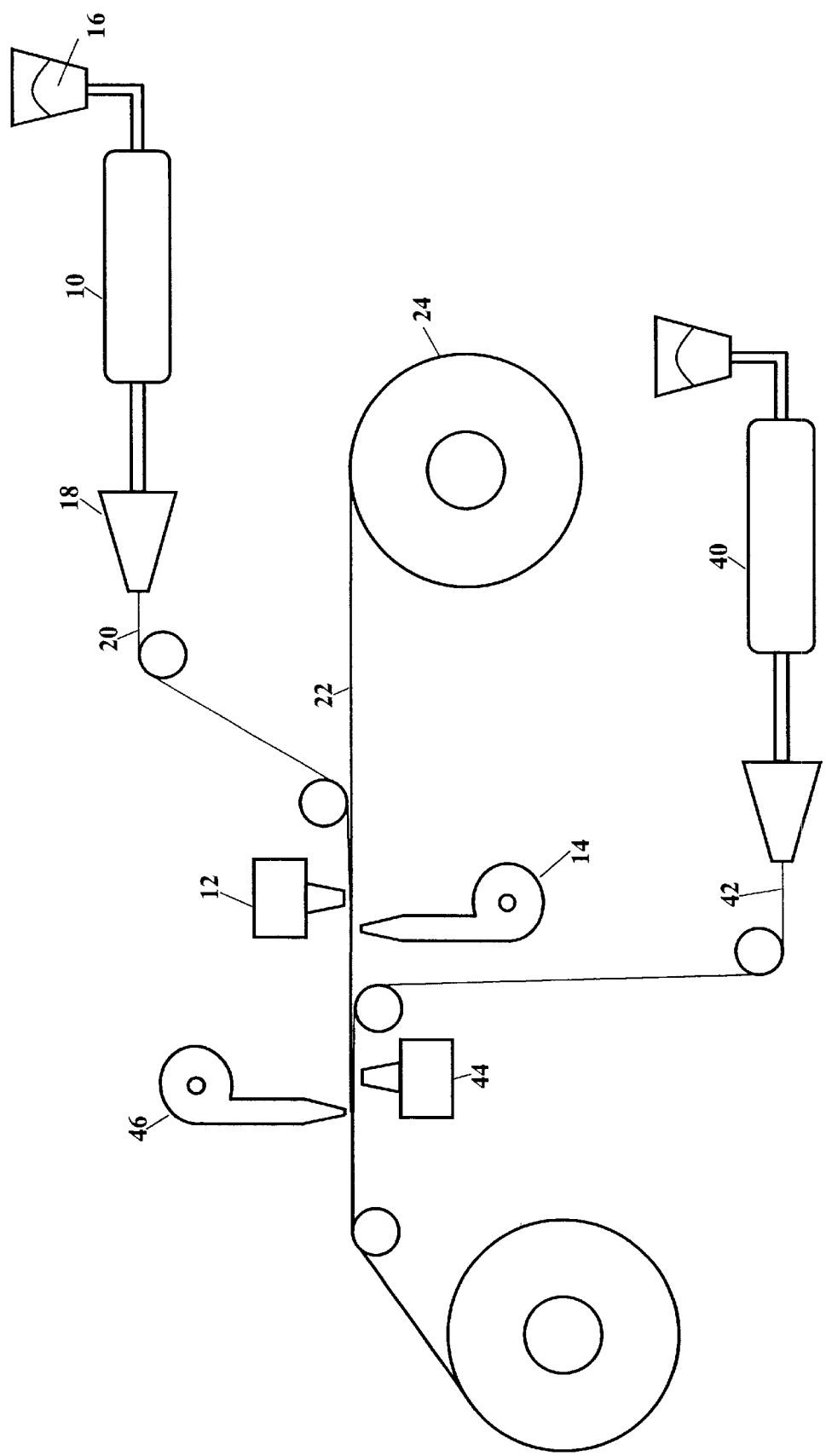
FIG. 3 shows another alternative embodiment of the process of the present invention.

FIG. 3 shows still another alternative embodiment of the process of the present invention. In this embodiment, however, a porous substrate is interposed between two films of polymer material. The extruder 10 produces the first continuous film 20 of polymer material. The film 20 of polymer material is overlaid onto the porous substrate, which is shown as the first fabric material 22.

The film 20 of polymer material is then subjected to heat and vacuum. The film 20 of polymer material is passed under the heating element 12 and is preferably heated to a temperature below the melting point. The film 20 of polymer material turns heated and tacky. Once film 20 of polymer material is heated, the vacuum unit 14 applies a vacuum. The applied vacuum draws the heated and tacky film 20 of polymer material into the porous first fabric material 22.

Once the vacuum action of the vacuum unit 14 is complete, another polymer coating is added. A second extruder 40 produces a second continuous film 42 of polymer material. The porous first fabric material 22, in this embodiment, is overlaid onto the second continuous film 42 of polymer material. A second heating element 44 is used to heat the second continuous film 42 of polymer material. Once the second film 42 of polymer material turns heated and tacky, a second vacuum unit 46 applies a vacuum. The heated and tacky second film 42 of polymer material is also drawn into the porous first fabric material 22.

Figure 4:
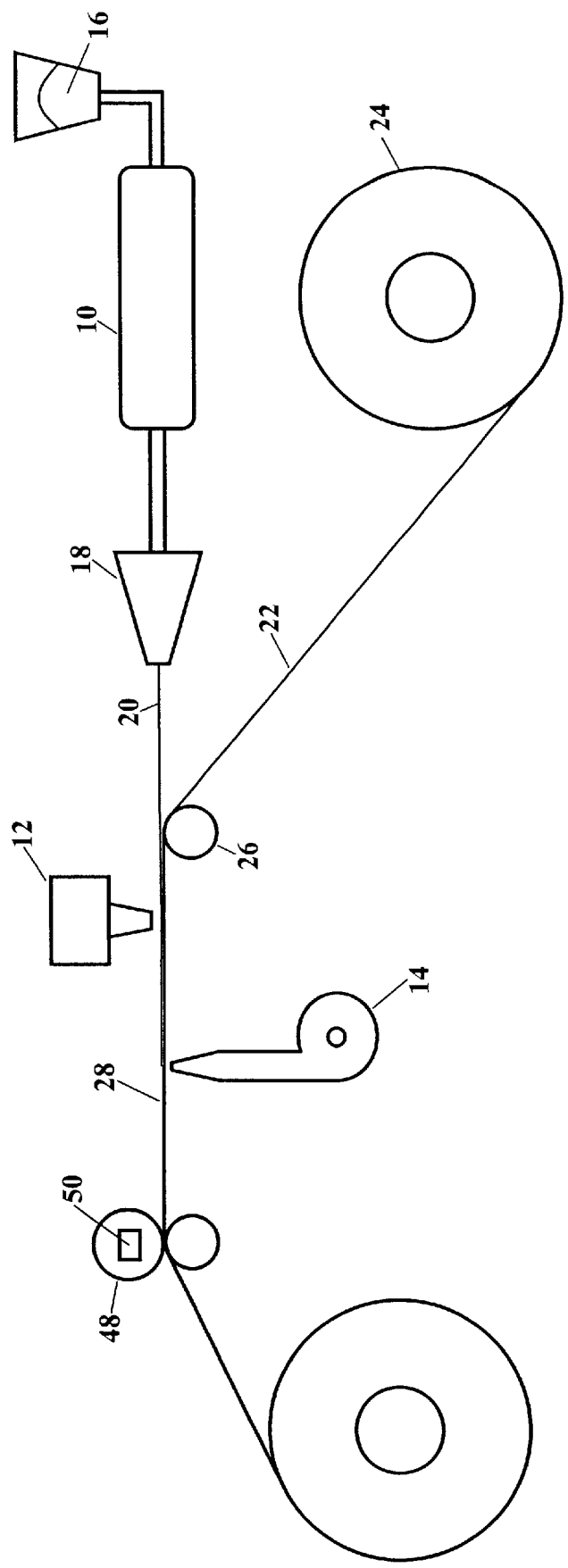
FIG. 4 is another alternative embodiment of the process of the present invention.

FIG. 4 is another alternative embodiment of the process of the present invention. This alternative embodiment adds at least one textured roller 48 after the vacuum unit 14 applies a vacuum. The at least one textured roller 48 is used to press a texture into an outer surface of the polymer-penetrated product 28. The at least one textured roller 48 can have nearly any texture desirable. The at least one textured roller 48 is used to press dimples, grooves, or any other impression. The at least one textured roller 48 can also be used to press floral patterns, leather-look patterns, wood grains, marbleizing effects, and nearly any other decorative pattern. The at least one textured roller 48 may include a roller heating element 50. The roller heating element 50 would apply heat to the textured roller 48 to improve processing.

Figure 5:
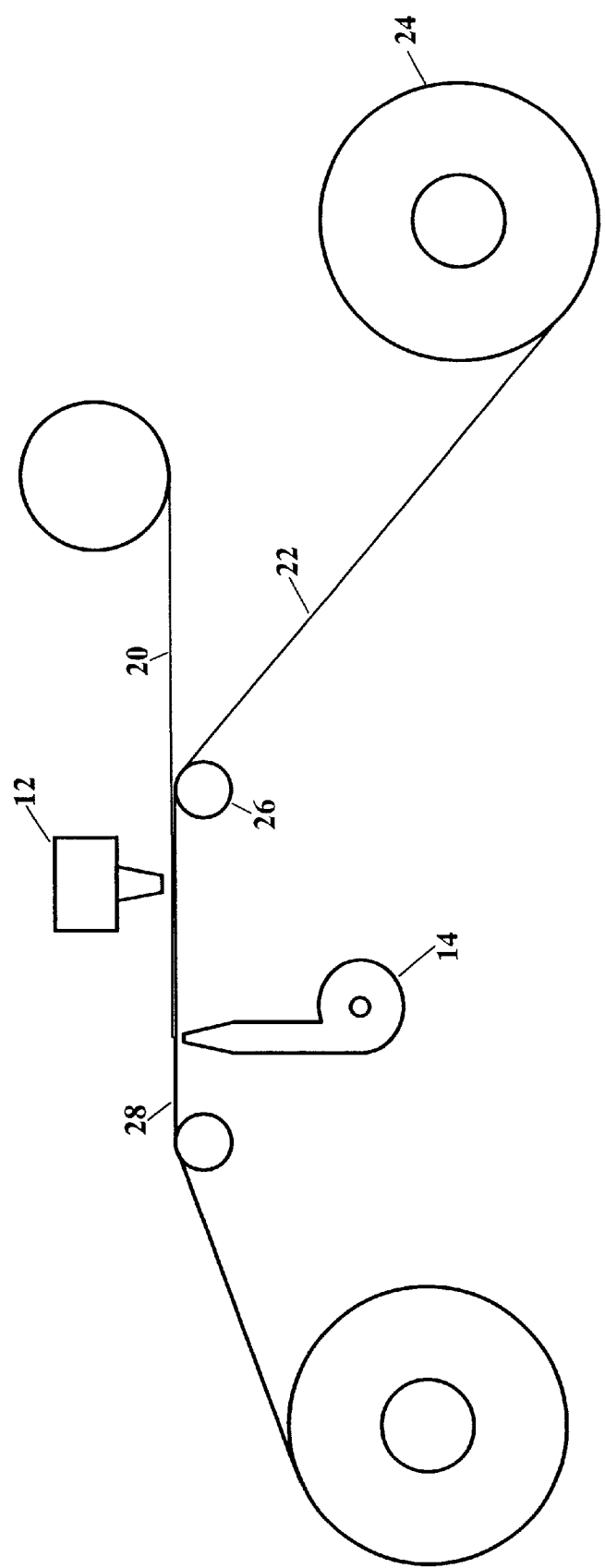
FIG. 5 shows still another alternative embodiment of the process of the present invention.

FIG. 5 is still another alternative embodiment of the process of the present invention. This alternative embodiment eliminates the extrusion step of the previous embodiments. Those skilled in the art readily recognize the process need not extrude the film of polymer material. Although the process is described as including an extrusion process, the film of polymer material could simply be provided in a pre-extruded or pre-cast bulk sheet or bulk roll packaging. The bulk packaging is simply overlaid onto the porous substrate. Once the pre-extruded film of polymer material is overlaid onto the porous substrate, the heating and vacuum operations are performed as shown in either of the previous figures.

Figure 6:
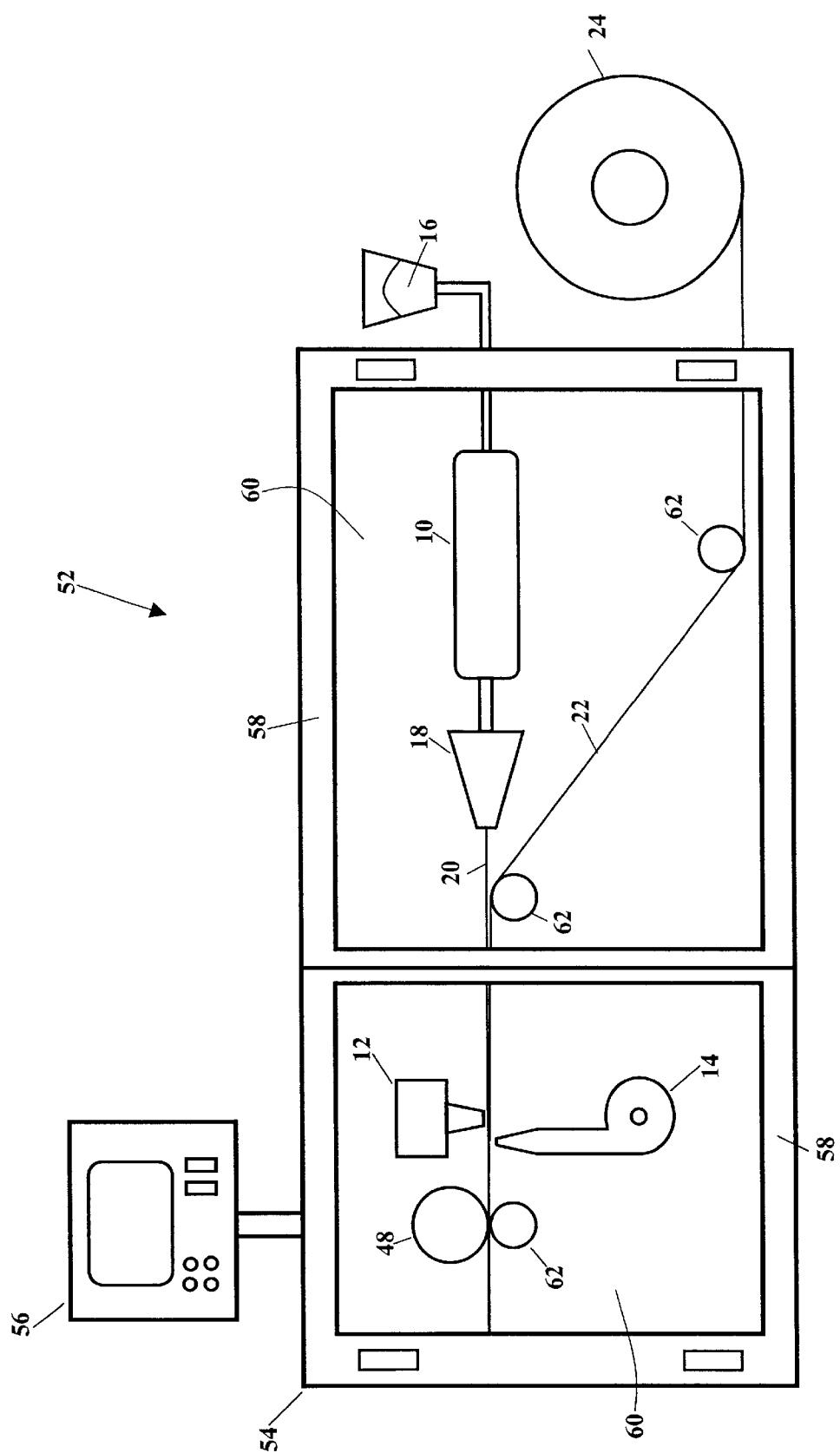
FIG. 6 shows an apparatus designed to implement the process of FIGS. 1–5.

FIG. 6 shows an apparatus 52 designed to implement the process of FIGS. 1–5. The apparatus 52 for producing polymer-coated porous substrates includes the heating element 12 and the vacuum unit 14. The heating element 12 and the vacuum unit 14 are conveniently housed within an enclosure 54. The apparatus 52 may include the at least one textured roller 48. The apparatus 52 may include an operator panel 56. The operator panel 56 would include instrumentation and controls to operate the apparatus 52. The enclosure 54 may conveniently include at least one access door 58. The at least one access door 58 allows an operator or technician to access the internal heating element, the internal vacuum unit, or any other component. The enclosure 54 may also conveniently include at least one window 60. The at least one window 60 allows the operator or technician to visually monitor production. The apparatus 52 may also include a roller system 62. The roller system can have various configurations to provide the porous substrate, to provide the film of polymer material, and to overlay the porous substrate and the film of polymer material.

The apparatus 52 may also include the extruder 10. The extruder 10 could also be enclosed within the enclosure 54. The extruder 10 would enable the apparatus 52 to accept pelletized/granular polymer material and extrude the film 20 of polymer material.

Those skilled in the art readily recognize any means for overlaying the porous substrate and the film of polymer material may be used. A translating system of plates, for example, could be used. The translating system of plates would deliver the porous substrate and the film of polymer material, and the system would orient the plates to cause an overlay motion. Of course those skilled in the art also recognize the porous substrate and the film of polymer material could be overlaid by hand.

The apparatus 52 may optionally include more vacuum units, more heating elements, and even more extruders. The apparatus 52 may include, for example, a second vacuum unit (e.g., shown as reference numeral 36 in FIG. 2). The addition of the second vacuum unit would enable the apparatus to produce the polymer-penetrated product 38 as described with reference to FIG. 2. The addition of a second heating element (e.g., shown as reference numeral 44 in FIG. 3) would enable the apparatus 52 to produce a porous substrate interposed between two films of polymer material. The apparatus 52 may also include the second extruder producing a second film of polymer material (such as shown with reference to FIG. 3).

While the present invention has been described with respect to various features, aspects, and embodiments, those skilled and unskilled in the art will recognize the invention is not so limited. Other variations, modifications, and alternative embodiments may be made without departing from the spirit and scope of the present invention.

What is claimed is:

1. A polymer coated porous product, comprising:
   at least one porous substrate; and
   a polymer coating penetrating the porous substrate in an amount sufficient to entangle the polymer coating within the porous substrate and resulting in a film on the porous substrate, and with said coating having been formed on the substrate through heating to a temperature above its vicat softening point, and below its melting point, at which it becomes tacky, and continuous extrusion vacuum lamination of a polymer film onto the porous substrate, which results in the polymer coating being entangled within the porous substrate, with pores in the product being small enough to prevent water penetration and larger than a molecule of water to prevent penetration of water and allow air and water vapors to migrate through the product.

2. The polymer coated porous product of claim 1, wherein said at least one porous substrate comprises a first porous substrate, and a second porous substrate, and wherein the polymer coating penetrates both the first porous substrate and the second porous substrate and forming a film on both.

3. The polymer coated porous product of claim 1, wherein said at least one porous substrate has a first side and a second side; and wherein the polymer coating penetrates both the first side and the second side and forms a film on both.

4. The polymer coated porous product of claim 1, wherein the film has a thickness of about 0.0001 inches to about 0.010 inches.

5. The polymer coated porous product of claim 1, wherein the polymer is a thermoplastic polymer.

6. The polymer coated porous product of claim 5, wherein the polymer is one of a polyurethane, a thermoplastic-polymide, a polyester co-polymer, an acrylic elastomer, a polyolefin elastomer, a propylene elstomer, a plasticized polyvinylchloride, a styrenic elastomer, a fluoroeslastomer, and a blend of one or more said polymers.

7. The polymer coated porous product of claim 5, wherein the porous substrate is made of one of cotton, silk, wool and a polymer blend.

8. A process for producing a polymer coated porous substrate, the process comprising the steps of:
   overlaying a film of polymer material onto a porous substrate;
   heating the film of polymer material to a temperature above its vicat softening point, and below its melting point, at which it becomes tacky; and
   vacuum drawing the heated film of polymer material onto the porous substrate in an amount sufficient to penetrate into the porous substrate and to entangle the polymer material within the porous substrate to produce a polymer penetrated porous substrate having a polymer film thereon with pores in the product being small enough to prevent water penetration and larger than a molecule of water to prevent penetration of water and allow air and water vapors to migrate through the product.

9. The process according to claim 8, wherein the step of heating the film of polymer material comprises heating to a temperature below the melting point of the film of polymer material, at which the film of polymer turns gummy or tacky.

10. A process according to claim 8, wherein the process further comprises the step of pressing a pattern into an outer surface of the polymer-penetrated porous substrate.

11. A process for producing a polymer coated porous substrate, the process comprising the steps of:
   placing a film of polymer material between a first porous substrate and a second porous substrate;
   heating the film of polymer material to a temperature above its vicat softening point, and below its melting point, at which it becomes tacky; and
   vacuum drawing the heated film of polymer material into the first porous substrate and into the second porous substrate to result in a polymer penetrated substrate product, and said vacuum drawing being conducted in a manner sufficient to cause the polymer material to penetrate into the first porous substrate and the second porous substrate and to entangle the polymer material within the first porous substrate and the second porous substrate, with pores in the product being small enough to prevent water penetration and larger than a molecule of water to prevent penetration of water and allow air and water vapors to migrate through the product.

12. The process according to claim 11, wherein the step of heating the film of polymer material comprises heating to a temperature below the melting point of the film of polymer material at which the film of polymer turns gummy or tacky.

13. The process according to claim 11, wherein the process further comprises the step of pressing a texture or pattern into an outer surface of the polymer-penetrated substrate product.

14. A process for producing polymer coated porous substrate, the process comprising the steps of:
placing the porous substrate between a first film of polymer material and a second film of polymer material;
heating the first film of polymer material to a temperature above its vicat softening point, and below its melting point, at which it becomes tacky;
vacuum drawing the heated first film of polymer material into the porous substrate in a manner sufficient to cause the polymer material to penetrate the porous substrate and to entangle the polymer material within the porous substrate;
heating the second film of polymer material to a temperature above its vicat softening point, and below its melting point, at which it becomes tacky; and
vacuum drawing the heated second film of polymer material into the porous substrate in a manner sufficient to cause the polymer material to penetrate the porous substrate and to entangle the polymer material within the porous substrate, thereby resulting in a polymer penetrated and coated substrate product, with pores in the product being small enough to prevent water penetration and larger than a molecule of water to prevent penetration of water and allow air and water vapors to migrate through the product.

15. A polymer coated porous product having a polymer film thereon, made according to a process, the process comprising:
i) placing a film of polymer material on a porous substrate, ii) heating the film of polymer material to a temperature above its vicat softening point, and below its melting point, at which it becomes tacky, and iii) vacuum drawing the film of polymer material into the porous substrate in a manner sufficient to cause the polymer material to penetrate into the porous substrate and to entangle the polymer material within the porous substrate, with pores in the product being small enough to prevent water penetration and larger than a molecule of water to prevent penetration of water and allow air and water vapors to migrate through the product.

16. A polymer coated porous product made according to a process, the process comprising:
i) placing a film of polymer material between a first porous substrate and a second porous substrate, ii) heating the film of polymer material to a temperature above its vicat softening point, and below its melting point, at which it becomes tacky, and iii) vacuum drawing the film of polymer material into the first porous substrate and into the second porous substrate in a manner sufficient to cause the polymer material to penetrate into the porous substrate and to entangle the polymer material within the porous substrate, with pores in the product being small enough to prevent water penetration and larger than a molecule of water to prevent penetration of water and allow air and water vapors to migrate through the product.

17. A polymer coated porous product made according to a process, the process comprising:
i) placing a porous substrate between a first film of polymer material and a second film of polymer material, ii) heating the first film of polymer material and the second film of polymer material, to a temperature above its vicat softening point, and below its melting point, at which it becomes tacky, and iii) vacuum drawing the first film of polymer material and the second film of polymer material onto the porous substrate in a manner sufficient to cause the polymer material to penetrate into the porous substrate and to entangle the polymer material within the porous substrate, with pores in the product being small enough to prevent water penetration and larger than a molecule of water to prevent penetration of water and allow air and water vapors to migrate through the product.

18. An apparatus for producing polymer coatings on a porous substrate, the apparatus comprising:
means for heating a film of polymer material to a temperature above the polymer material's vicat point, and below its melting point, at which it becomes tacky; and
at least one vacuum unit, the at least one vacuum unit configured for drawing the film of polymer material into the porous substrate in an amount sufficient to penetrate into the porous substrate and to entangle the polymer material within the porous substrate, resulting in pores in the product being small enough to prevent water penetration and larger than a molecule of water to prevent penetration of water and allow air and water vapors to migrate through the product.

19. An apparatus according to claim 14, the apparatus further comprising means for overlaying the porous substrate and the film of polymer material.

20. The polymer coated porous product of claim 1, wherein porous substrate is a woven fiber, and the polymer material penetrates the woven fiber in a manner in which the fibers are severed and discontinuous.

21. The polymer coated porous product of claim 1, wherein the porous substrate is a non-woven fiber, and the polymer material penetrates the non-woven fiber in a manner in which the fibers are severed and discontinuous.

22. The process of claim 8, wherein the porous substrate is a woven fiber, and wherein the vacuum drawing is conducted in a manner to cause the polymer material to penetrate and sever and make the fibers discontinuous.

23. The process of claim 8, wherein the porous substrate is a non-woven fiber, and wherein the vacuum drawing is conducted in a manner to cause the polymer material to penetrate and sever and make the fibers discontinuous.

24. The process of claim 11, wherein porous substrate is a woven fiber, and wherein the vacuum drawing is conducted in a manner to cause the polymer material to penetrate and sever and make the fibers discontinuous.

25. The process of claim 11, wherein the porous substrate is a non-woven fiber, and wherein the vacuum drawing is conducted in a manner to cause the polymer material to penetrate and sever and make the fibers discontinuous.

26. The process of claim 14, wherein porous substrate is a woven fiber, and wherein the vacuum drawing is conducted in a manner to cause the polymer material to penetrate and sever and make the fibers discontinuous.

27. The process of claim 14, wherein the porous substrate is a non-woven fiber, and wherein the vacuum drawing is conducted in a manner to cause the polymer material to penetrate and sever and make the fibers discontinuous.

28. The polymer coated process product of claim 15, wherein porous substrate is a woven fiber, and the polymer material penetrates the woven fiber in a manner in which the fibers are severed and discontinuous.

29. The polymer coated porous product of claim 15, wherein the porous substrate is a non-woven fiber, and the polymer material penetrates the non-woven fiber in a manner in which the fibers are severed and discontinuous.

30. The polymer coated porous product of claim 16, wherein porous substrate is a woven fiber, and the polymer material penetrates the woven fiber in a manner in which the fibers are severed and discontinuous.

31. The polymer coated porous product of claim 16, wherein the porous substrate is a non-woven fiber, and the polymer material penetrates the non-woven fiber in a manner in which the fibers are severed and discontinuous.

32. The polymer coated porous product of claim 17, wherein porous substrate is a woven fiber, and the polymer material penetrates the woven fiber in a manner in which the fibers are severed and discontinuous.

33. The polymer coated porous product of claim 17, wherein the porous substrate is a non-woven fiber, and the polymer material penetrates the non-woven fiber in a manner in which the fibers are severed and discontinuous.

\* \* \* \* \*